(12) United States Patent
Madnani et al.

(10) Patent No.: US 9,348,530 B2
(45) Date of Patent: *May 24, 2016

(54) PRESENTATION OF VIRTUAL ARRAYS USING N-PORT ID VIRTUALIZATION

(75) Inventors: Kiran Madnani, Framingham, MA (US); Adi Ofer, Framingham, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/318,757

(22) Filed: Dec. 27, 2005

(65) Prior Publication Data

US 2007/0208836 A1 Sep. 6, 2007

(51) Int. Cl.
*G06F 3/06* (2006.01)

(52) U.S. Cl.
CPC ............ *G06F 3/0637* (2013.01); *G06F 3/0605* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,247,632 A | 9/1993 | Newman | |
| 5,568,629 A | 10/1996 | Gentry et al. | |
| 5,963,555 A | 10/1999 | Takase et al. | |
| 6,336,152 B1 | 1/2002 | Richman et al. | |
| 6,421,711 B1 * | 7/2002 | Blumenau et al. | 709/213 |
| 6,563,834 B1 | 5/2003 | Ogawa | |
| 6,684,209 B1 | 1/2004 | Ito et al. | |
| 6,839,750 B1 | 1/2005 | Bauer et al. | |
| 6,907,505 B2 | 6/2005 | Cochran et al. | |
| 6,944,785 B2 | 9/2005 | Gadir et al. | |
| 7,043,663 B1 | 5/2006 | Pittelkow et al. | |
| 7,051,101 B1 | 5/2006 | Dubrovsky et al. | |
| 7,120,728 B2 | 10/2006 | Krakirian et al. | |
| 7,124,143 B2 | 10/2006 | Matsunami et al. | |
| 7,260,737 B1 | 8/2007 | Lent et al. | |
| 7,318,120 B2 | 1/2008 | Rust et al. | |
| 7,340,639 B1 | 3/2008 | Lee et al. | |

(Continued)

FOREIGN PATENT DOCUMENTS

| | | |
|---|---|---|
| EP | 1130514 A2 | 9/2001 |
| EP | 1357465 A | 10/2003 |
| WO | 03/062979 A | 7/2003 |

OTHER PUBLICATIONS

Office Action for U.S. Appl. No. 11/318,734 mailed Sep. 22, 2008 (44 pages).

(Continued)

*Primary Examiner* — Ilwoo Park
(74) *Attorney, Agent, or Firm* — Schmeiser, Olsen & Watts LLP

(57) ABSTRACT

A storage array presents virtual arrays to hosts through use of virtual port IDs. The storage array includes groups of logical units of storage. The groups are coupled to a switch through at least one physical port. Each group is assigned a unique virtual port ID for each physical port to which it is coupled. The virtual port IDs are assignable by the switch. The virtual port IDs are used by hosts coupled to the switch to exchange data with the groups to which the virtual port IDs are assigned. Further, a zoning table in the switch can associate each virtual port ID to a host facing port on the switch. In this case each host can communicate only with groups of logical units that are assigned virtual IDs associated with the host facing port to which it is coupled.

23 Claims, 12 Drawing Sheets

(56) References Cited

U.S. PATENT DOCUMENTS

| | | | |
|---|---|---|---|
| 7,366,846 B2 | 4/2008 | Boyd et al. | |
| 7,383,357 B2 | 6/2008 | Leichter et al. | |
| 7,398,421 B1 | 7/2008 | Limaye et al. | |
| 7,433,948 B2 | 10/2008 | Edsall et al. | |
| 7,500,134 B2 | 3/2009 | Madnani et al. | |
| 7,979,517 B1* | 7/2011 | Wang et al. | 709/221 |
| 2002/0071386 A1 | 6/2002 | Gronke | |
| 2002/0165982 A1 | 11/2002 | Leichter et al. | |
| 2003/0018927 A1 | 1/2003 | Gadir et al. | |
| 2003/0131182 A1 | 7/2003 | Kumar et al. | |
| 2004/0054866 A1 | 3/2004 | Blumenau et al. | |
| 2004/0133576 A1 | 7/2004 | Ito et al. | |
| 2004/0139240 A1 | 7/2004 | DiCorpo et al. | |
| 2004/0151188 A1 | 8/2004 | Maveli et al. | |
| 2004/0177228 A1 | 9/2004 | Leonhardt et al. | |
| 2004/0213272 A1 | 10/2004 | Nishi et al. | |
| 2004/0243710 A1 | 12/2004 | Mao | |
| 2005/0008016 A1 | 1/2005 | Shimozono et al. | |
| 2005/0010688 A1 | 1/2005 | Murakami et al. | |
| 2005/0015415 A1 | 1/2005 | Garimella et al. | |
| 2005/0120160 A1 | 6/2005 | Plouffe et al. | |
| 2005/0154849 A1 | 7/2005 | Watanabe | |
| 2005/0204104 A1 | 9/2005 | Aoshima et al. | |
| 2005/0243611 A1 | 11/2005 | Lubbers et al. | |
| 2005/0251620 A1 | 11/2005 | Matsunami et al. | |
| 2006/0041595 A1 | 2/2006 | Taguchi et al. | |
| 2006/0047930 A1 | 3/2006 | Takahashi et al. | |
| 2006/0064466 A1 | 3/2006 | Shiga et al. | |
| 2006/0075005 A1 | 4/2006 | Kano et al. | |
| 2006/0080516 A1 | 4/2006 | Paveza et al. | |
| 2006/0107010 A1 | 5/2006 | Hirezaki et al. | |
| 2006/0155777 A1 | 7/2006 | Shih et al. | |
| 2006/0190698 A1 | 8/2006 | Mizuno et al. | |
| 2007/0220310 A1 | 9/2007 | Sharma et al. | |
| 2007/0234342 A1 | 10/2007 | Flynn et al. | |
| 2007/0266212 A1 | 11/2007 | Uchikado et al. | |
| 2007/0291785 A1 | 12/2007 | Sharma et al. | |
| 2008/0005468 A1 | 1/2008 | Faibish et al. | |
| 2008/0086608 A1 | 4/2008 | Kano | |
| 2010/0185828 A1* | 7/2010 | Kano | G06F 3/0605 711/165 |

OTHER PUBLICATIONS

Office Action for U.S. Appl. No. 11/318,719 mailed Sep. 17, 2008 (21 pages).
Office Action mailed Sep. 3, 2008 for U.S. Appl. No. 11/427,646.
Office Action mailed Dec. 9, 2008 for U.S. Appl. No. 11/427,724.
Final Office Action mailed Sep. 17, 2008 for U.S. Appl. No. 11/427,749.
Office Action mailed Jul. 20, 2009 for U.S. Appl. No. 11/427,724.
Office Action mailed Oct. 2, 2009 for U.S. Appl. No. 11/771,604.
Final Office Action mailed Oct. 21, 2009 for U.S. Appl. No. 11/318,734.
Final Office Action mailed Oct. 28, 2009 for U.S. Appl. No. 11/318,719.
Notice of Allowance mailed Dec. 3, 2009 for U.S. Appl. No. 11/318,719.
Notice of Allowance mailed Dec. 11, 2009 for U.S. Appl. No. 11/318,734.
Notice of Allowance mailed Nov. 16, 2009 for U.S. Appl. No. 11/427,646.
Final Office Action mailed Dec. 2, 2009 for U.S. Appl. No. 11/427,759.
Final Office Action mailed Dec. 14, 2009 for U.S. Appl. No. 11/427,744.
Final Office Action mailed Dec. 14, 2009 for U.S. Appl. No. 11/427,749.
Final Office Action mailed Dec. 29, 2009 for U.S. Appl. No. 11/427,731.
Office Action mailed Nov. 27, 2009 for U.S. Appl. No. 11/771,686.
Notice of Allowance mailed Mar. 6, 2010 for U.S. Appl. No. 11/427,724.
Office Action mailed Nov. 16, 2010 for U.S. Appl. No. 11/427,731.
Office Action mailed Dec. 16, 2010 for U.S. Appl. No. 11/427,749.
Office Action mailed Dec. 13, 2010 for U.S. Appl. No. 11/427,744.
Office Action mailed Feb. 3, 2011 for U.S. Appl. No. 11/427,759.
Final Office Action mailed Jul. 2, 2010 for U.S. Appl. No. 11/771,604.
Final Office Action mailed Jun. 23, 2010 for U.S. Appl. No. 11/771,686.
Office Action mailed May 6, 2011 for U.S. Appl. No. 11/427,731, 23 pgs.
Office Action mailed Apr. 21, 2011 for U.S. Appl. No. 11/771,686, 23 pgs.
Non-Final Office Action in related U.S. Appl. No. 11/771,604, mailed on Aug. 15, 2012; 17 pages.
Final Office Action in related U.S. Appl. No. 11/771,604, mailed on Apr. 5, 2012; 21 pages.
Final Office Action in related U.S. Appl. No. 11/427,759, mailed on Jul. 21, 2011; 15 pages.
Final Office Action in related U.S. Appl. No. 11/427,744, mailed on Sep. 16, 2011; 21 pages.
Final Office Action in related U.S. Appl. No. 11/427,749, mailed on Sep. 21, 2011; 17 pages.
Notice of Allowance in Related U.S. Appl. No. 11/771,686, mailed on Mar. 9, 2015; 9 pages.
Notice of Allowance in related U.S. Appl. No. 11/427,731, mailed on Apr. 12, 2013; 10 pages.
Notice of Allowance in related U.S. Appl. No. 11/427,744, mailed on Apr. 12, 2013; 12 pages.
Notice of Allowance in related U.S. Appl. No. 11/427,759, mailed on Jul. 5, 2013; 20 pages.
Notice of Allowance in related U.S. Appl. No. 11/427,749, mailed on Dec. 18, 2012; 5 pages.
International Search Report for PCT/US2006/062353 on Aug. 20, 2007, 3 pages.
Ofer; U.S. Appl. No. 11/318,719, filed Dec. 27, 2005; 73 pages.
Madnani; U.S. Appl. No. 11/318,675, filed Dec. 27, 2005; 90 pages.
Ofer; U.S. Appl. No. 11/318,734, filed Dec. 27, 2005; 75 pages.
Brown, et al.; U.S. Appl. No. 11/427,646, filed Jun. 29, 2006; 47 pages.
Ofer, et al.; U.S. Appl. No. 11/427,759, filed Jun. 29, 2006; 76 pages.
Ofer, et al.; U.S. Appl. No. 11/427,724, filed Jun. 29, 2006; 78 pages.
Madnani, et al.; U.S. Appl. No. 11/427,731, filed Jun. 29, 2006; 82 pages.
Madnani, et al.; U.S. Appl. No. 11/427,744, filed Jun. 29, 2006; 83 pages.
Ofer, et al.; U.S. Appl. No. 11/427,749, filed Jun. 29, 2006; 76 pages.
Charles Millilgan et al., Online Storage Virtualization: The key to managing the data explosion, Proceedings of the 35th Hawaii International Conference on System Sciences, 2002, IEEE.
Office Action mailed Mar. 19, 2008 for U.S. Appl. No. 11/427,759.
Office Action mailed Mar. 20, 2008 for U.S. Appl. No. 11/427,731.
Office Action mailed Mar. 20, 2008 for U.S. Appl. No. 11/427,744.
Office Action mailed Mar. 18, 2008 for U.S. Appl. No. 11/427,749.
Notice of Allowance mailed Jun. 12, 2008 for U.S. Appl. No. 11/318,675.
Office Action mailed Nov. 26, 2012 for U.S. Appl. No. 11/427,731, 9 pgs.
Office Action mailed Nov. 26, 2012 for U.S. Appl. No. 11/427,744, 9 pgs.
Office Action mailed Mar. 5, 2009 for U.S. Appl. No. 11/427,646.
Office Action mailed Mar. 17, 2009 for U.S. Appl. No. 11/427,759.
Office Action mailed Apr. 27, 2009 for U.S. Appl. No. 11/427,731.
Office Action mailed Apr. 27, 2009 for U.S. Appl. No. 11/427,744.
Office Action mailed Apr. 27, 2009 for U.S. Appl. No. 11/427,749.
Office Action mailed May 7, 2009 for U.S. Appl. No. 11/318,734.
Office Action mailed May 11, 2009 for U.S. Appl. No. 11/318,719.

* cited by examiner

| LUN Name | Port ID | LUN # |
|---|---|---|
| a0 | 0 | L00 |
| b0 | 0 | L01 |
| c0 | 0 | L02 |
| d0 | 0 | L10 |
| e0 | 0 | L11 |
| f0 | 0 | L12 |
| g0 | 0 | L20 |
| h0 | 0 | L21 |
| i0 | 0 | L22 |
| j0 | 0 | L30 |
| k0 | 0 | L31 |
| l0 | 0 | L32 |
| m0 | 0 | L40 |
| n0 | 0 | L41 |
| p0 | 0 | L42 |
| q0 | 0 | L50 |
| r0 | 0 | L51 |
| s0 | 0 | L52 |
| a1 | 1 | L60 |
| b1 | 1 | L61 |
| c1 | 1 | L62 |
| d1 | 1 | L70 |
| e1 | 1 | L71 |
| f1 | 1 | L72 |
| g1 | 1 | L80 |
| h1 | 1 | L81 |
| i1 | 1 | L82 |
| j1 | 1 | L90 |
| k1 | 1 | L91 |
| l1 | 1 | L92 |

Fig. 5

| Port Name | Port ID | Virtual Port ID |
|---|---|---|
| apa | 0 | v0 |
| apa | 0 | v1 |
| apa | 0 | v2 |
| apb | 1 | v3 |
| apb | 1 | v4 |
| apb | 1 | v5 |

Fig. 8

| LUN Name | Virtual Port ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |
| g0 | v1 | L20 |
| h0 | v1 | L21 |
| i0 | v1 | L22 |
| j0 | v1 | L30 |
| k0 | v1 | L31 |
| l0 | v1 | L32 |
| m0 | v2 | L40 |
| n0 | v2 | L41 |
| p0 | v2 | L42 |
| q0 | v2 | L50 |
| r0 | v2 | L51 |
| s0 | v2 | L52 |
| a1 | v3 | L60 |
| b1 | v3 | L61 |
| c1 | v3 | L62 |
| d1 | v3 | L70 |
| e1 | v3 | L71 |
| f1 | v3 | L72 |
| g1 | v4 | L80 |
| h1 | v4 | L81 |
| i1 | v4 | L82 |
| j1 | v4 | L90 |
| k1 | v4 | L91 |
| l1 | v4 | L92 |
| p0 | v5 | L42 |
| q0 | v5 | L50 |
| r0 | v5 | L51 |
| s0 | v5 | L52 |

Fig. 9

Host Facing Port ID

| Virtual Port ID | |
|---|---|
| v0 | 200 |
| v1 | 201 |
| v2 | 202 |
| v3 | 203 |
| v4 | 204 |
| v5 | 202 |

70a → LUN Name | Virtual Port ID | LUN #

| LUN Name | Virtual Port ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |

| LUN Name | Virtual Port ID | LUN # |
|---|---|---|
| g0 | v1 | L20 |
| h0 | v1 | L21 |
| i0 | v1 | L22 |
| j0 | v1 | L30 |
| k0 | v1 | L31 |
| l0 | v1 | L32 |

PRESENTATION OF VIRTUAL ARRAYS USING N-PORT ID VIRTUALIZATION

FIELD OF THE INVENTION

The present invention relates generally to the field of storage systems, and particularly to ways of presenting virtual arrays.

BACKGROUND OF THE INVENTION

Today's enterprise data centers store ever-larger amounts of business critical data that must be immediately and continuously available. Ever larger and more complex storage systems are used for storage of the data. Many different hosts and applications access data on these storage systems. In order to provide security and prevent data corruption, it is often necessary to ensure that the applications and hosts have exclusive access to particular areas of storage in the system.

One mechanism for partitioning storage systems employs the concept of "virtual arrays". Accordingly, software is provided within a storage array to logically partition the array into separate storage groups. These groups are accessible only to hosts that have been granted access by the storage array. Other hosts cannot access a storage group to which they have not been granted access. Unfortunately, the current methods for partitioning storage arrays into virtual arrays are highly complex and expensive, and operate only at the storage array level. It is desirable to provide a simpler, inexpensive means of presenting virtual arrays to host systems, and to provide a way of centralizing array partitioning from another part of the system—for example, the fabric.

SUMMARY OF THE INVENTION

In accordance with the principles of the invention, a storage array includes a plurality of groups of logical units of storage. At least one physical port is coupled to the groups. The groups are coupled to a switch through the at least one physical port. Each group is assigned a unique virtual port ID for each physical port to which it is coupled. Further in accordance with the invention, the virtual port IDs are assignable by the switch. The virtual port IDs are is used by hosts coupled to the switch to exchange data with the groups to which the virtual port IDs are assigned.

The invention is particularly applicable in a Fibre Channel fabric environment. Each group of logical units thereby has its own unique virtual port ID through which it can be addressed by a host. The groups thus appear to the host as separate virtual arrays In accordance with a further aspect of the invention, the switch includes host facing ports. Each host is coupled to the switch through a host facing port. A zoning table in the switch associates each virtual port ID to a host facing port. Each group communicates only with hosts coupled to host facing ports associated with the virtual ID assigned to the group. Each group now appears to a host as a separate physical storage array.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 5 is a representation of a LUN table in a host.

FIG. 8 is a representation of the name table in the switch in accordance with the invention.

FIG. 9 is a representation of a LUN table in a host in accordance with the invention.

FIG. 12A is a representation of a LUN table in one host when the zoning table in the switch is operational.

FIG. 12B is a representation of a LUN table in a second host when the zoning table in the switch is operational.

DETAILED DESCRIPTION OF EXEMPLARY EMBODIMENTS

Figure 1:
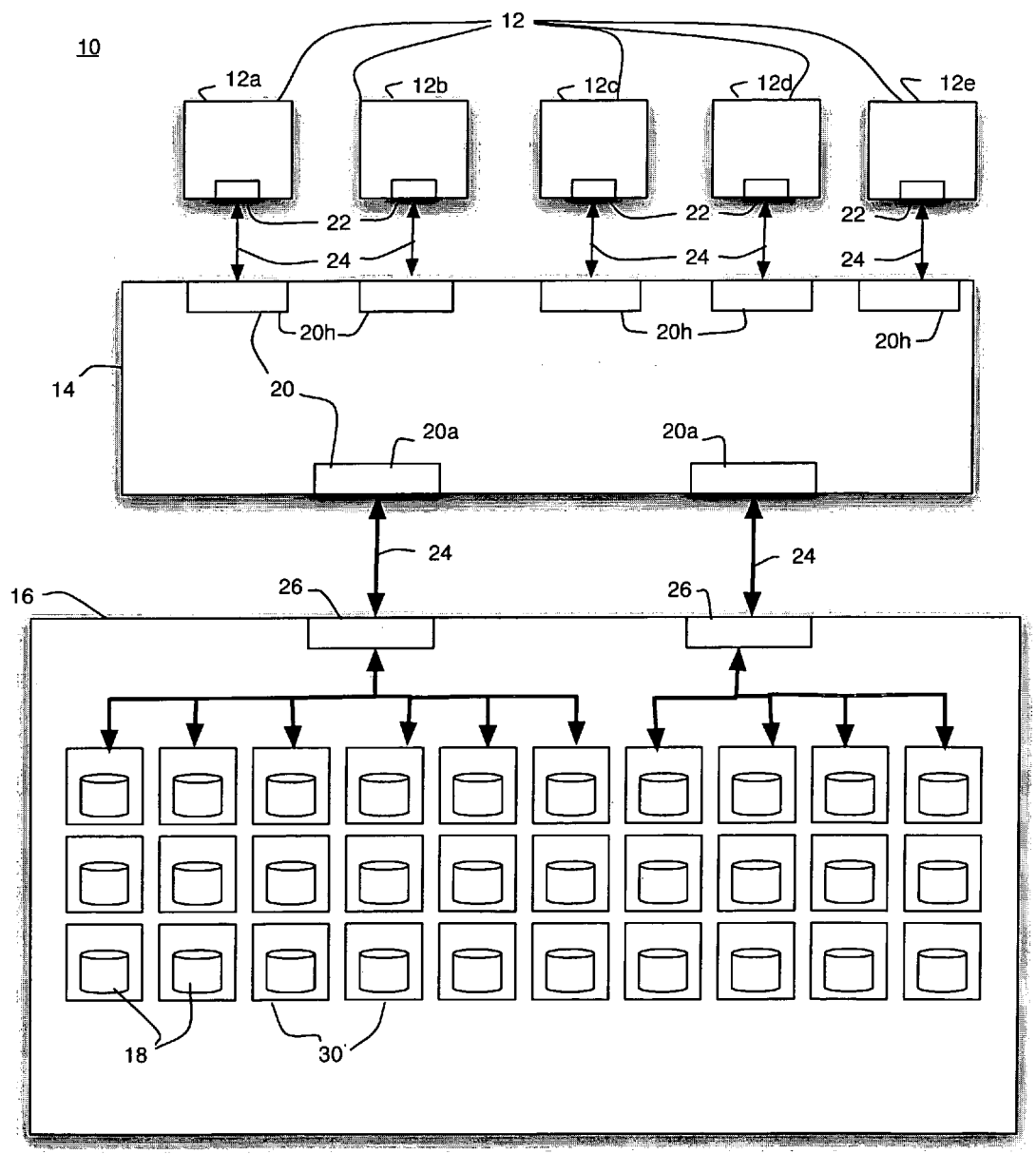
FIG. 1 is a representation of a storage area network. The storage area network includes a Fibre Channel array and hosts coupled to a Fibre Channel fabric switch.

In FIG. 1 there is shown a functional block diagram of an exemplary storage area network 10 in which the invention can be implemented. The storage area network 10 employs a Fibre Channel fabric topology. Fibre Channel is a high speed serial transport used in storage systems. It is described in a series of standards that can be found at X3T9.3 Task Group of ANSI: *Fibre Channel Physical and Signaling Interface* (FC-PH), Rev. 4.2 Oct. 8, 1993. Hosts 12, shown individually as 12a, 12b, 12c, 12d and 12e are coupled to a Fibre Channel "fabric" in the storage system, herein shown as a switch 14. A storage array 16 including disk drives 18 is also coupled to the switch 14. The hosts 12 communicate with the disk drives 18 via a cross-point Fibre Channel connection through the switch 14.

The switch 14 includes switch ports 20. Host facing switch ports are labeled as 20h. Array facing switch ports are labeled as 20a. Host ports 22 on the hosts are coupled via Fibre Channel links 24 to host-facing switch ports 20h on the switch 14. Physical array ports 26 on the array 16 are coupled via Fibre Channel links 24 to array-facing switch ports 20a on the switch 14. The disks 18 within the array 16 are organized into logical units ("LUNs") 30. "LUN", originally a SCSI (small computer system interface) term, is now commonly used to describe a logical unit of physical storage space. The LUNs are exported by the array ports 26 for access by the hosts 12 via the fibre channel links 24 and switch 14. As herein shown, each disk appears to be configured as a separate LUN, though it is understood that a LUN can encompass part of a disk, or parts of multiple disks, or multiple complete disks. The arrangement shown is chosen for convenience of description.

In a Fibre Channel system such as that of FIG. 1, each Fibre Channel device (including but not limited to host ports and array ports) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID", that is dynamic and dependent upon the configuration of the system. The IDs are used for directing information between hosts and arrays in the system. Port addresses are commonly referred to as "port IDs". LUN addresses are commonly referred to as "LUN numbers". After initialization, the hosts 12 communicate with the array ports 26 and LUNs 30 by sending messages to the appropriate port ID and LUN number.

Figure 2:
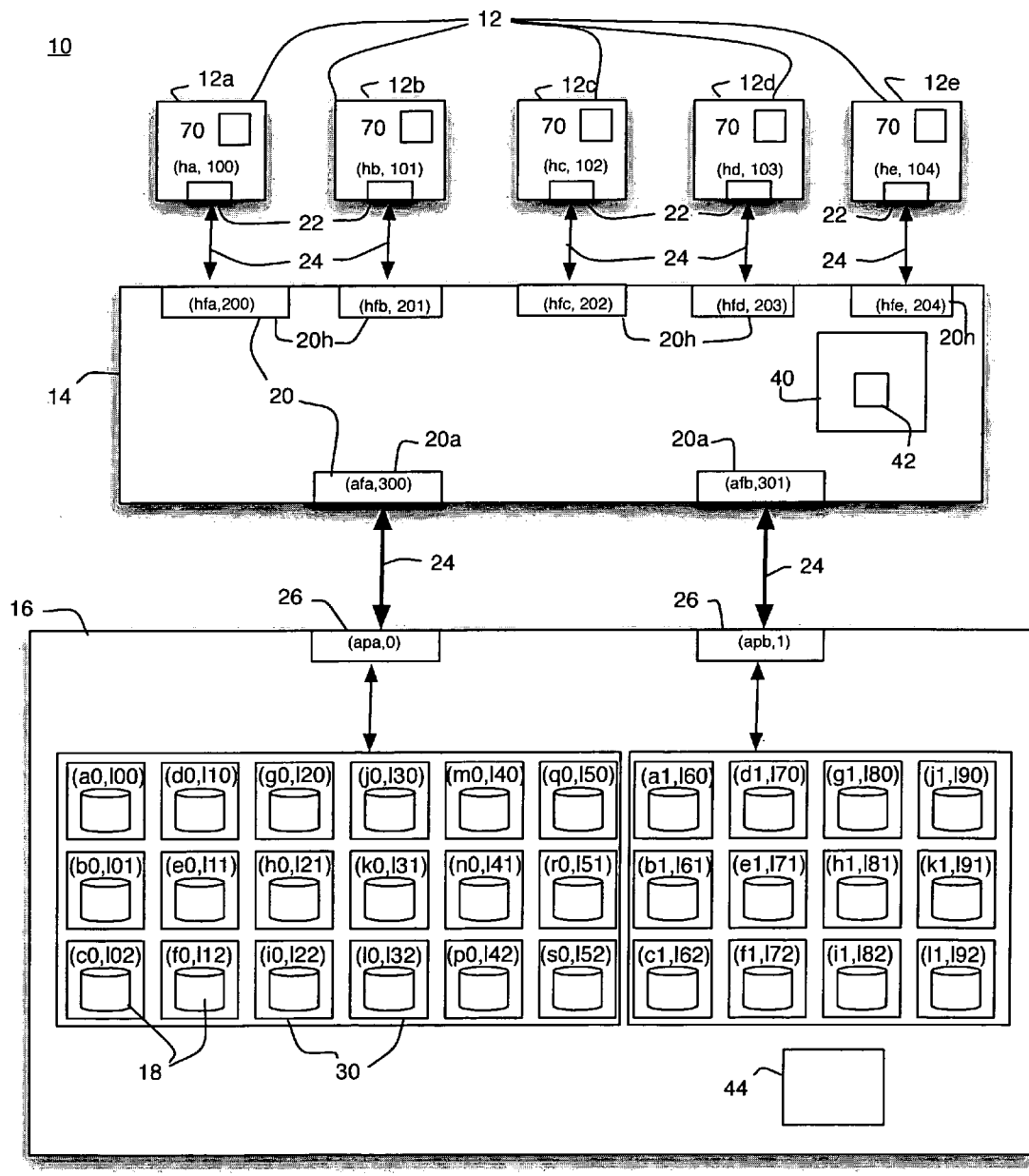
FIG. 2 is a representation of the storage area network of FIG. 1, showing Fibre Channel port IDs and LUN names and numbers.

In a Fabric topology, the switch 14 assigns IDs to the host ports 22 and array ports 26 during initialization. IDs as described in the Fibre Channel specification are actually 24 bit quantities containing several fields. In FIG. 2 names and IDs are shown symbolically with alphanumeric symbols for simplicity of explanation. The names and IDs of each port and LUN are shown as a pair (name, ID). For instance, the host port 22 on the host 12a is shown to have a name and ID of (ha, 100). The names and IDs for the ports 22 on the hosts 12b-e are (hb, 101), (hc, 102), (hd, 103) and (he, 104). The host-facing switch ports 20h are shown to have names and IDs (hfa, 200), (hfb, 201), (hfc, 202), (hfd, 203), and (hfe, 204). Array-facing switch ports 20h are shown to have names and IDs (afa, 300) and (afb, 301). The array ports 26 are shown to have names and IDs (apa, 0), and (apb, 1). Each LUN 30 has a name and LUN number. For example, the LUN of name a0 is LUN number L00. LUN numbers L00, L01, L02, L10, L11, L12, L20, L21, L22, L30, L31, L32, L40, L41, L42, L50, L51, AND L52 are shown as accessible via array port ID 0. LUN numbers L60, L61, L62, L70, L71, L72, L80, L81, L82, L90, L91, and L92 are shown as accessible via array port ID 1.

Figures 3A, 3B:
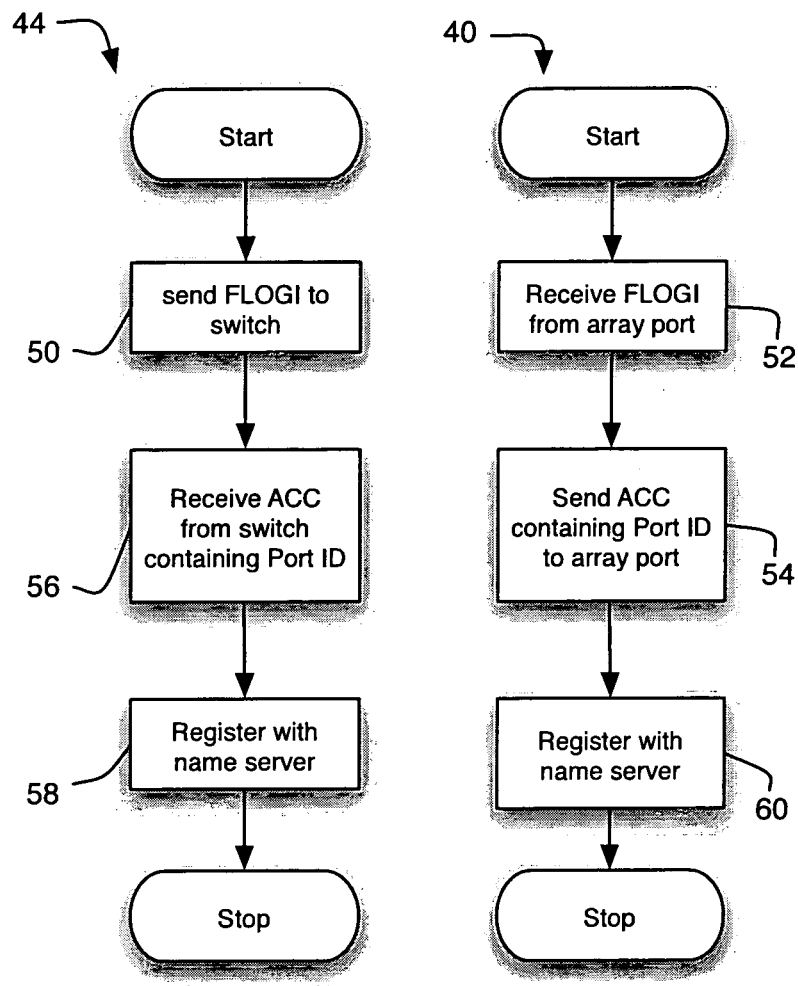
FIG. 3A is a flow diagram representing the operation of the array controller during Fibre Channel system initialization.
FIG. 3B is a flow diagram representing the operation of the switch during Fibre Channel system initialization.

The Fibre Channel switch 14 includes a name server database 40. The name server database 40 is used by the switch 14 to assign IDs to host ports 22 and array ports 26 during initialization. The name server database 40 includes a name server table 42 that is used by the switch to resolve IDs to names. The general process by which port IDs are assigned in accordance with the Fibre Channel T1 standard is shown in FIGS. 3A and 3B. FIG. 3A shows the process by which the switch 14 assigns Port IDs. FIG. 3B shows the process by which the fibre channel array controller 44 in the array 16 (FIG. 2) communicates with the switch 14. First, each array port (i.e. ports 0 and 1) is logged in to the switch 14 by the array controller 44 (FIG. 3A step 50). The port logins are received by the name server database 40 (FIG. 3B step 52.) When the switch 14 receives a port login ("FLOGI") command, it responds by sending an acknowledgement message to the array controller 44 (FIG. 3B step 54). This acknowledgement message contains a Port ID for the array port that was logged in. The acknowledgement message is received by the array controller 44 (FIG. 3A step 56). Then, a registration process is performed by the switch 14 (FIG. 3A step 58, FIG. 3B step 60). During the registration process, the name server table 42 is built and distributed to nodes registered to receive it.

Figure 4:
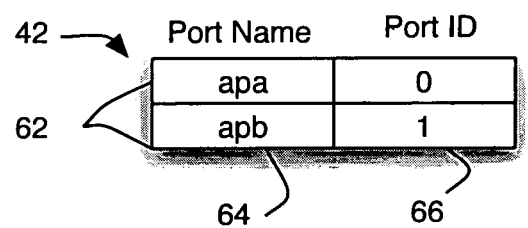
FIG. 4 is a representation of a name table managed by the name server database in the switch.

An example of the name server table 42 is shown in FIG. 4. The full contents of the name server table 42 are described in the Fibre Channel Name Server MIB, described in the IETF RFC 4044, "Fibre Channel Management MB", herein incorporated by reference. FIG. 3 shows only enough of the table 42 to contribute to understanding of the invention. The table 42 includes multiple entries 62, each including a port name field 64 and a port address ID field 66. During the registration process of FIGS. 3A and 3B, the entries 62 are populated with the switch port 26 names and Port IDs assigned by the switch 14. For the example array 16 shown in FIG. 1, an entry 44 includes the port name apa and Port ID 0, while another entry 62 includes the port name apb and Port ID 1. The switch 14 then sends this table 42 to all members of the SAN 10 registered to receive state change notifications. This includes the hosts 12. The hosts 12 now have the Port IDs of the array ports 26 so Fibre Channel communications between the hosts 12 and array 16 can ensue.

Now that the hosts have IDs to access the ports, they can learn what. LUNs are available. LUN names and numbers are managed at the array level. Each host 12 sends a query to each array port 26 ID in turn, requesting a list of available LUN numbers. Once the LUN numbers for a given array port ID are known, the host is able to query each LUN 30 by using a combination of the port ID and LUN number to access the LUNs 30. The host 12 then queries each LUN 30 for its corresponding LUN name. Once the host has gathered all this information, it builds a directory LUN table 70 that relates LUN names, port IDs, and LUN numbers. A representation of such a LUN table 70 is shown in FIG. 5. The table includes an entry 72 for each LUN it has discovered. Each entry includes a LUN name field 74, a port ID field 76 and a LUN number field 78, which in combination identify the LUN 30. The table 70 for a host 12 of FIG. 2 includes the LUN names, port IDs, and LUN numbers for the LUNs 30 on the array 16 for each port ID 0 and 1. For example, one entry 72 shows a LUN with name a0 and LUN number L00 associated with Port ID 0. Another entry 72 shows a LUN with name k0 and address L31 associated with Port ID 0. Yet another entry 72 shows a LUN with name e1 and LUN number L71 associated with Port ID 1.

During operation, hosts 12 refer to LUNs 30 by their LUN numbers. In order to access a LUN 30, a host 12 port 22 sends a message whose Fibre Channel address includes the array port ID and LUN number. The switch 14 parses the port ID portion of the address in order to forward the message to the identified array port 26. The array 16 then uses the LUN number portion of the address to access the proper LUN 30 within the array 16. So, for example, if host 12a needs to access LUN #L71, the host 12a port 22 sends a message to an address including the port ID 1 and the LUN number L71. The switch 14 sees the port ID 1 and sends the message to the array port 26 with ID 1. The array sees that the message is directed to LUN # L71 and thus proceeds to perform the appropriate operation on LUN #L71.

Note that, in accordance with the prior art arrangement of FIG. 2, a host has actual access to all LUNs on each array port to which it has access. For example, the host 12a has access to port ID 0, and therefore has access to LUNs L00-L52.

It is often desirable to separate a storage array into several distinctly accessible sub-arrays, or "virtual arrays". Each host or application has access to a virtual array, but does not have access to the other virtual arrays within the storage array. For example, it may be desirable to arrange the LUN numbers L00-L12 as a first virtual array accessible only to the host 12a, and LUN numbers L20-L32 as a second virtual array accessible only to the host 12b. Such an arrangement can provide security against data corruption and can provide ease of management for host applications. But, in the prior art example of FIG. 2, all the LUNs L00-L52 are exposed via the same port ID 0, and thus cannot be hidden at the fabric level from either host 12a or host 12b. Virtual arrays have therefore previously been provided only through implementation of complex software on the storage array.

In accordance with the principles of the invention, the storage array and fabric are employed to present virtual arrays to the hosts. The LUNs in a storage array 16 are arranged into several storage groups. The term "storage group" can have different meanings in different contexts, so for clarity, a "storage group" as used herein is simply a group of LUNs. Virtual Port IDs are established over each physical port on the array. Each storage group has assigned to it at least one virtual port ID, used by the hosts to access the storage groups. Each storage group is thus separately accessible via at least one unique virtual port ID. A host 12 can access only the LUNs 30 in a storage group with a virtual port ID to which the switch 14 allows it access. As will be seen, the provision of unique virtual IDs for each storage group allows zoning to be applied by the switch 14 such that each host 12 has access to only designated storage groups. The storage groups thus appear as individual virtual arrays to the hosts 12. Therefore, the storage groups will herein further be referred to as "presented virtual arrays".

Figure 6:
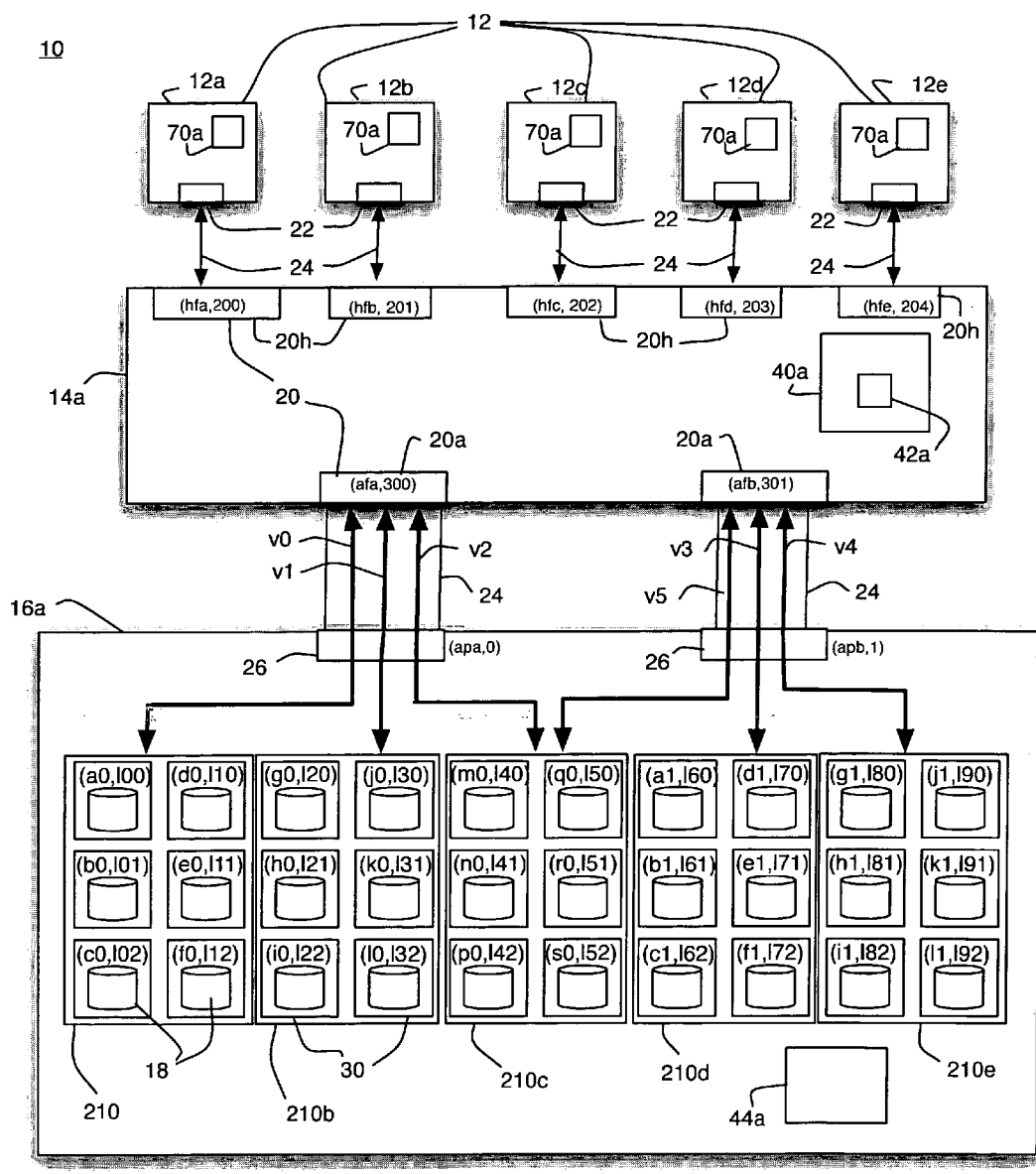
FIG. 6 is a representation of a storage area network wherein the LUNs in the storage array are arranged into groups and are separately addressable via virtual port IDs in accordance with the invention.

In FIG. 6, the storage system 10 has been modified so that presented virtual arrays can be accessed by the hosts. The modified storage array 16a is shown to include presented virtual arrays 210a, 210b, 210c, 210d, and 210e. The LUN 30 storage groups forming the presented virtual arrays can be arranged for example by a modified fibre channel controller 44a (shown) or by a separate controller, or by pre-configured software programming or dynamic user programming of the array 16, or any combination thereof. Each presented virtual array 210a-210e is associated with at least one "virtual port ID" v0-v5. Generally, each presented virtual array 210a-210e is assigned one or more virtual port IDs depending upon how many physical ports the virtual array is accessible through. As shown by example, the presented virtual array 210a is associated with the physical array Port ID 0 and is assigned one virtual port ID v0. The presented virtual array 210b is also associated with the physical array Port ID 0 and is assigned one virtual port ID v1. The presented virtual array 210c is associated with both the physical array ports Port ID 0, 1, and is thus assigned two virtual port IDs v2 and v5. The presented virtual arrays 210d and 210e are both associated with the physical array Port ID 1 and are assigned virtual port IDs v3 and v4 respectively.

Figures 7A, 7B:
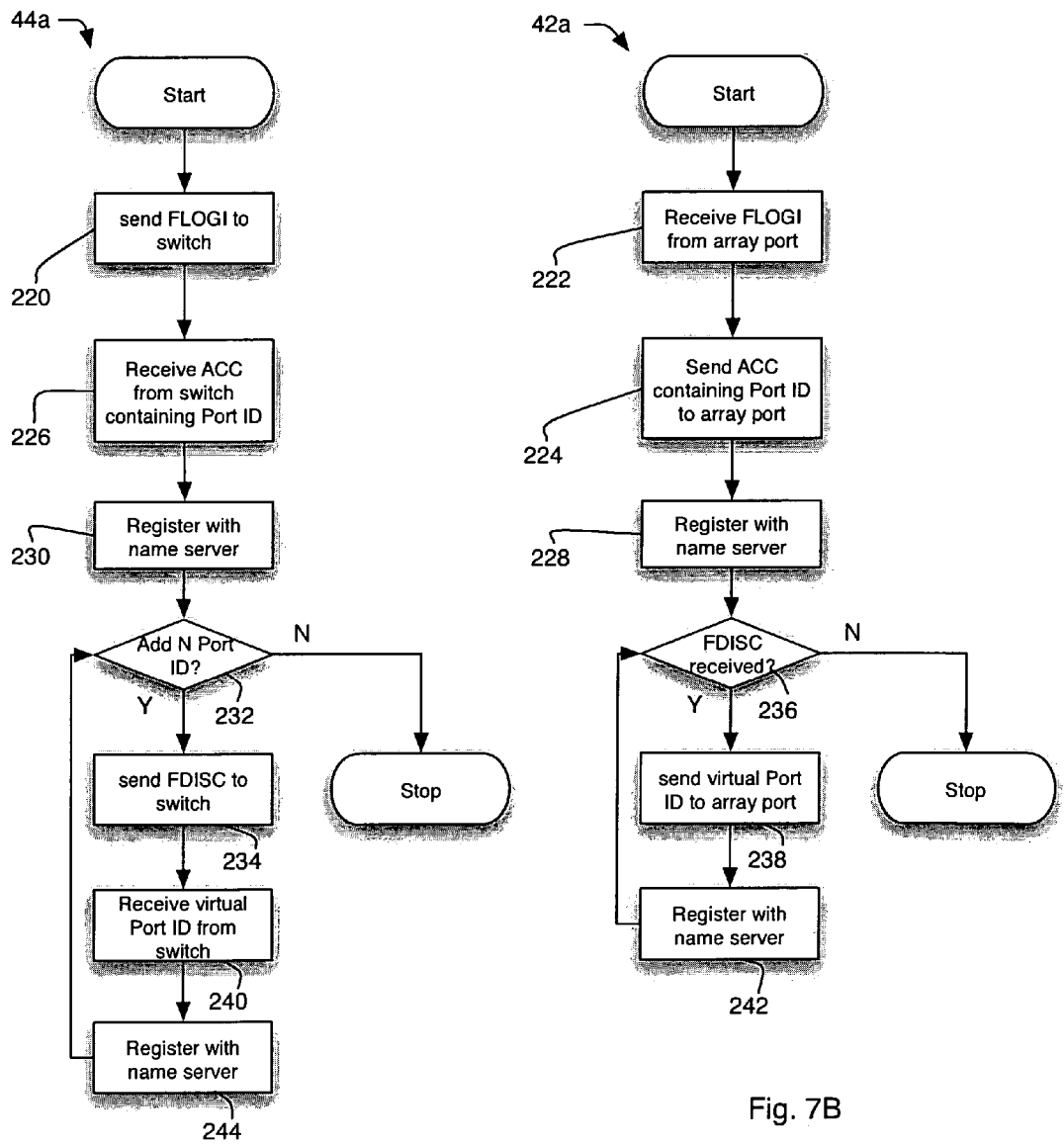
FIG. 7A is a flow diagram representing the operation of the array controller during Fibre Channel system initialization when virtual port IDs are implemented on the storage array.
FIG. 7B is a flow diagram representing the operation of the switch during Fibre Channel system initialization when virtual port IDs are implemented on the storage array.

In accordance with one implementation of the virtual Port IDs of the invention, the virtual port IDs are assigned by the modified switch 14a. The ANSI T11 standard " ", which currently defines virtual ports used by hosts, is extended to support storage arrays. The process by which virtual Port IDs are provided by the switch 14a is shown in FIGS. 7A and 7B. FIG. 7A shows the process by which the fibre channel array controller 44a in the array 16 communicates with the switch 14a. FIG. 7B shows the process by which the switch 14a assigns Port IDs. First, each array port (i.e. ports 0 and 1) is logged in to the switch 14a by the array controller 44a (FIG. 7A step 220). The port logins are received by the switch 14a (FIG. 7B step 222.) When the switch 14a receives a port login ("FLOGI") command, it responds by sending an acknowledgement message to the array controller 44a (FIG. 7B step 224). This acknowledgement message contains a Port ID for the array port that logged in. The acknowledgement message is received by the array 16 controller 44a (FIG. 7A step 226). Then, a registration process is performed by the switch 14a (FIG. 7A step 228, FIG. 7B step 230). During the registration process, the name server table 42a is built as previously described with regard to name server table 42.

Then, if virtual port IDs are needed by the array 16a ports 26 (step 232), the array controller 44a sends an "FDISC" command to the switch 14a (step 234). The switch 14a receives the FDISC command (step 236) and responds by sending a virtual port ID to the array controller 44a (step 238). The array controller 44a receives the virtual port ID from the switch 14a (step 240). The switch 14a and array controller 44a then perform the registration process to add the virtual Port ID to the name server table 42a, as will be described (steps 242, 244). The FDISC command and response is repeated for each virtual ID required for each physical port (steps 232-244).

Now the switch 14a can build the name server table 42a in a manner similar to that previously described with respect to name server table 42, except the name server table 42a associates multiple virtual port IDs with the physical port names. An example of such a name server table 42a is shown in FIG. 8. The physical array port 26 with name apa and Port ID 0 is also associated with the virtual port IDs v0, v1, v2, and v5. Likewise, the physical array port 26 with name apb and Port ID 1 is associated with the virtual port IDs v3, v4, and v5. At this point, the switch 14a can update the hosts 12 with the contents of the name server table 42a as previously described. The hosts 12 will thereby receive all the virtual port IDs v0-v5.

Now that the hosts 12 have the virtual port IDs v0-v5, they can build their directory LUN tables in a manner similar to that previously described with regard to FIG. 5, except that now each virtual port ID will be associated with LUN names and numbers. Accordingly, each host 12 sends a query to each virtual array port ID v0-v5 in turn, requesting a list of available LUN numbers. Once the LUN numbers for a given virtual array port ID are known, the host is able to query each LUN 30 by using a combination of the virtual port ID and LUN number to access the LUNs. The host 12 then queries each LUN 30 for its corresponding LUN name. Once the host has gathered all this information, it builds a directory LUN table 50a that relates LUN names, virtual port IDs, and LUN numbers. A representation of such a LUN table 70a is shown in FIG. 9. The table includes an entry 72a for each LUN it has discovered. Each entry includes a LUN name field 74a, a virtual port ID field 76a and a LUN number field 78a, which in combination identify the LUN. For example, the LUNs 30 associated with the presented virtual array 210a—i.e. virtual port ID v0—are (a0, L00), (b0, L01), (c0, L02), (d0, L10), (e0, L11), and (f0, L12). Note also that the presented virtual array 210c (LUN#s L40-L52) is dual-ported; that is, it is accessible via virtual port IDs v2 and v5. LUNs in dual-ported presented virtual arrays may have two separate LUN numbers as well, one for use when accessed on the first virtual port ID, and the second for use when accessed on the second virtual port ID. Dual-ported presented virtual arrays can be useful for high availability purposes.

In accordance with one advantage of the invention, storage array "zoning" can be implemented at the fabric switch in order to physically separate the presented virtual arrays for access only by certain hosts. Fibre Channel switches are able to implement zoning, whereby access between host ports and array ports is specified. But zoning can only be implemented at the port level; that is, it cannot be implemented at the LUN level. In the prior art arrangement of FIG. 2, zoning cannot be used to separate the storage groups of LUNs 210a, 210b, 210c as shown FIG. 3, because all the LUNs have the same Port ID 0.

But in accordance with this further aspect of the invention, since each presented virtual array 210a-e is associated with its own unique virtual Port ID v0-v5, the switch 14a can differentiate between each presented virtual array 210a-e based upon its virtual Port ID. The switch 14a can be programmed to allow or disallow access to each virtual port address from each host facing array port address through the use of its zoning process. Host access to the presented virtual arrays 210a-e can thus be physically separated, enhancing security, data integrity, and ease of storage management for host applications.

Figure 10:
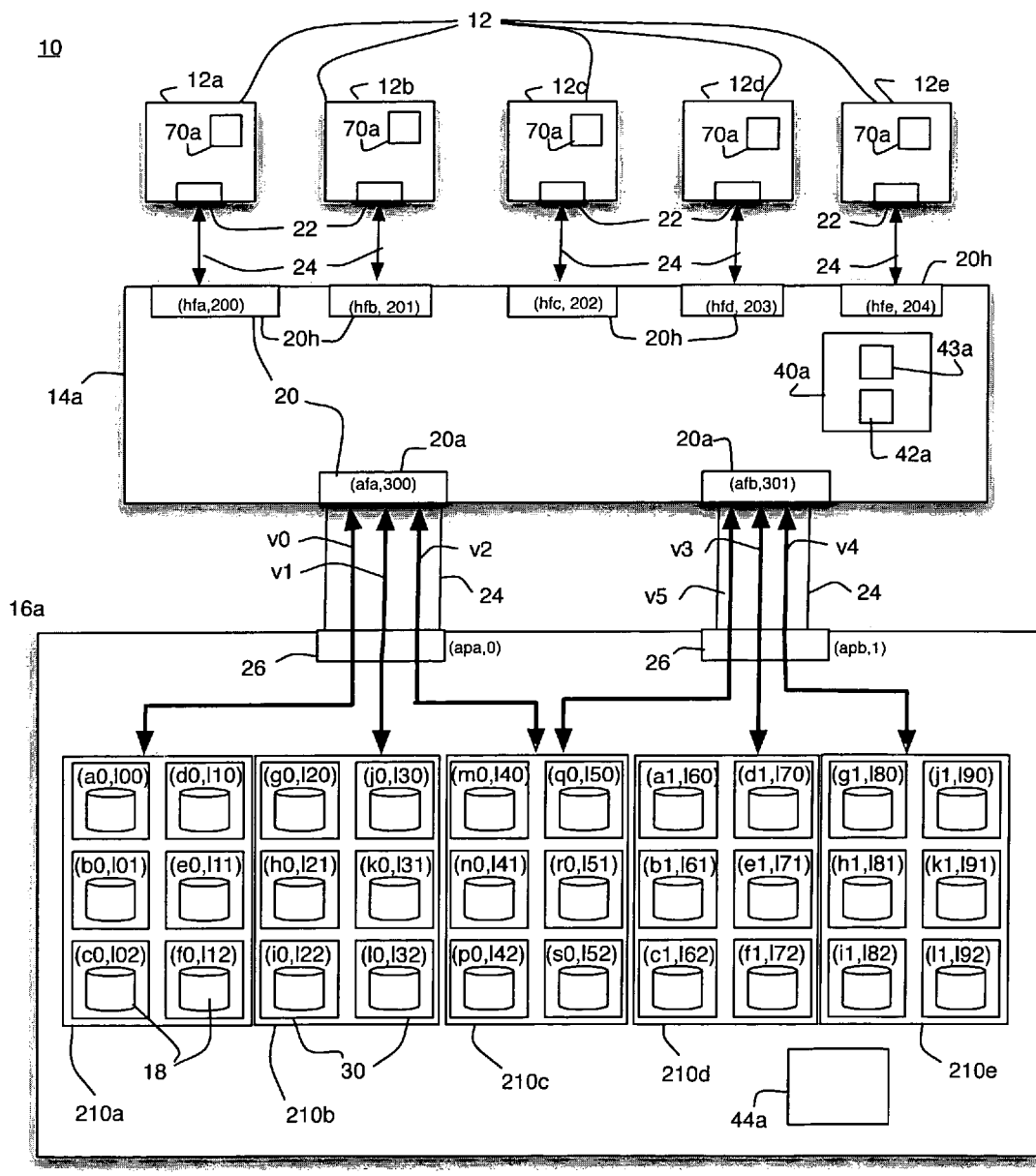
FIG. 10 is a representation of the system of FIG. 6 wherein the name server database in the switch further includes a zoning table.

Referring now to FIG. 10, the switch name server database 40a is shown to include a zoning table 43a as well as a name table 42a. The full contents of a zoning table as used by a prior art fibre channel switch is described at " ". The zoning table 43a is modified in accordance with the invention to include virtual array port IDs. Only the portions of the zoning table 43a relevant to an understanding of the invention are shown here. Accordingly, the zoning table 43a has entries 252 including a virtual port ID field 254 and a host facing switch port ID field 256. For each virtual port ID recognized by the switch 14, the name server database 40a can associate one or more host facing switch port IDs with the virtual port ID. For example, in the table shown, virtual port ID v0 is associated with host facing switch port ID 200. Virtual port ID v1 is associated with host facing switch port ID 201. Virtual port ID v2 is associated with host facing switch port ID 202. Virtual port ID v4 is associated with host facing switch port ID 204. Virtual port ID v5 is associated with host facing switch port ID 202. (Host facing array port 202 is dual ported on virtual port IDs v2 and v5.)

Figures 11, 13:
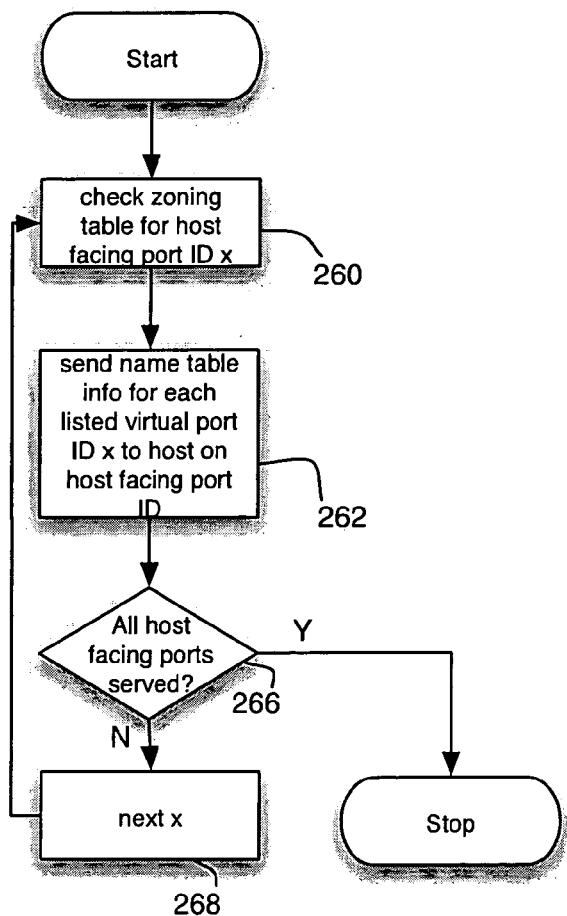
FIG. 11 is a representation of the zoning table of FIG. 10.
FIG. 13 is a flow diagram representing the operation of the switch when a zoning table is in use.

Now, when the switch 14a updates the hosts 12 with the contents of the name server table 42a, it uses the zoning table 43a to filter the presentation of the name server table 42a information to the hosts 12. Referring to FIG. 12 there are shown several examples of the LUN tables 70a in the hosts 12a and 12b. When the switch 14a updates the hosts 12, the switch 14a refers to the zoning table 43a—for example the table of FIG. 11. The process by which the switch 14a uses the zoning table 43a is shown in FIG. 13. The switch 14a checks the zoning table 43a for the first host facing port ID 200 (step 260). The switch 14a sees that the host facing array port ID 200 is authorized to access only virtual array port v0. So, only the name table information associated with virtual port ID 0 is forwarded to the host 12a that is coupled to the host facing switch port ID 200 (step 262). The host 12a thus receives the address information for the virtual port v0. The LUN table 70a for the host 12a thus looks like that shown in FIG. 12A. The host 12a is limited to access to the LUNs L00-L12 on virtual Port ID v0. The switch 14a then checks the zoning table 43a for access information for the host facing switch port ID 201 (steps 266, 268, 260). The switch 14a sees that the host facing switch port ID 201 is authorized to access only virtual array port v1. So, only the name table information associated with virtual array port v1 is forwarded to the host 12b that is coupled to the host facing switch port ID 201 (step 262). The host 12b thus receives the address information for the virtual port v1. The LUN table 70a for the host 12b thus looks like that shown in FIG. 12B. The host 12b is limited to access to the LUNs L20-L32 on virtual Port ID v1. This process continues for each host facing switch port ID (steps 266-262).

Now each host has access to only the LUNs 30 on the virtual array ports allowed by the zoning table 43a in the switch 14, rather than to all LUNs 30 on a physical array port 26. The invention thus allows a very simple and efficient means of presenting virtual arrays to the hosts, without requiring complex array level software.

The present invention is not to be limited in scope by the specific embodiments described herein. Various modifications of the present invention, in addition to those described herein, will be apparent to those of ordinary skill in the art from the foregoing description and accompanying drawings. For example, the disclosed controllers can be implemented in hardware, software, or both. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A storage array comprising:
a plurality of physical ports for coupling the storage array to a switch; and
a plurality of individual logical units of physical storage space organized into a plurality of groups of logical units of storage, each group having at least two of the individual logical units such that the at least two individual logical units are part of the group distinguished from being mapped to the group, each group being coupled to one or more physical ports of the plurality of physical ports on the storage array, each group being assigned a unique virtual port ID that uniquely identifies the group for each physical port on the array to which the group is coupled, with each group of the plurality of groups of logical units of storage that is coupled to two or more physical ports of the plurality of physical ports being assigned a unique virtual port ID for each of the two or more physical ports to which that same group is coupled such that multiple unique virtual port IDs are assigned to that same group, wherein a group of the plurality of groups of logical units of storage is assigned multiple virtual port IDs and two physical ports of the two or more physical ports, and wherein a first virtual port ID of the multiple port IDs corresponds to the first physical port of the two physical ports and a second virtual port ID of the multiple port IDs corresponds to the second physical port of the two physical ports.

2. The storage array of claim 1 wherein the virtual port IDs are assignable by the switch.

3. The storage array of claim 2 wherein a virtual port ID is used by a host coupled to the switch to exchange data with the group to which the virtual port ID is assigned.

4. The storage array of claim 2 wherein the switch to which the groups can be coupled comprises:
host facing ports, each host facing port coupled to a host; and
a zoning table associating each virtual port ID to a host facing port.

5. The storage array of claim 4 wherein each group communicates only with hosts coupled to host facing ports associated with the virtual ID assigned to the group.

6. The storage array of claim 5 wherein the storage array is a fibre channel array and wherein the at least one physical port is a fibre channel port.

7. A system comprising:
a plurality of hosts; and
a storage array including a plurality of physical ports for coupling the storage array to a switch, the storage array including a plurality of individual logical units of physical storage space organized into a plurality of groups of logical units of storage, each group being coupled to one or more physical ports of the plurality of physical ports on the storage array, each group having at least two of the individual logical units such that the at least two individual logical units are part of the group distinguished from being mapped to the group, each group being assigned a unique virtual port ID that uniquely identifies the group for each physical port on the array to which the group is coupled, with each group of the plurality of groups of logical units of storage that is coupled to two or more physical ports of the plurality of physical ports being assigned a unique virtual port ID for each of the two or more physical ports to which that same group is coupled such that multiple unique virtual port IDs are assigned to that same group, each host communicating with a given group of the plurality of groups of logical units of storage via the switch using one of the one or more unique virtual port IDs assigned to the given group, wherein a group of the plurality of groups of logical units of storage is assigned multiple virtual port IDs and two physical ports of the two or more physical ports, and wherein a first virtual port ID of the multiple port IDs corresponds to the first physical port of the two physical ports and a second virtual port ID of the multiple port IDs corresponds to the second physical port of the two physical ports.

8. The system of claim 7 further comprising a switch, wherein the hosts and storage array are coupled to the switch, and the virtual port IDs are assigned by the switch.

9. The system of claim 8 wherein a virtual port ID is used by a host to exchange data with the group to which the virtual port ID is assigned.

10. The system of claim 8 wherein the switch comprises:
host facing switch ports via which the hosts are coupled to the switch;
a zoning table for associating virtual port IDs with host facing ports.

11. The system of claim 10 wherein each host communicates only with groups having assigned virtual IDs associated with the host facing switch port to which the host is coupled.

12. The system of claim 11 wherein the storage array is a fibre channel array and wherein the at least one physical port is a fibre channel port.

13. A method comprising the steps of:
providing a storage array including a plurality of physical ports;
coupling the storage array to a switch via the physical ports;
arranging logical units in the storage array into a plurality of individual logical units of physical storage space organized into a plurality of groups of logical units of storage, each group having at least two of the individual logical units such that the at least two individual logical units are part of the group distinguished from being mapped to the group, each group being coupled to one or more physical ports of the plurality of the physical ports on the array;
assigning to each group a unique virtual port ID that uniquely identifies the group for each physical port on the array to which it is coupled, with each group of the plurality of groups of logical units of storage that is coupled to two or more physical ports of the plurality of physical ports being assigned a unique virtual port ID for each of the two or more physical ports to which that same group is coupled such that multiple unique virtual port IDs are assigned to that same group, wherein a group of the plurality of groups of logical units of storage is assigned multiple virtual port IDs and two physical ports of the two or more physical ports, and wherein a first virtual port ID of the multiple port IDs corresponds to the first physical port of the two physical ports and a second virtual port ID of the multiple port IDs corresponds to the second physical port of the two physical ports.

14. The method of claim 13 wherein the step of assigning is performed by the switch.

15. The method of claim 14 further including the steps of:
coupling a host to the switch;
using by the host a virtual port ID to exchange data with the group in the storage array to which the virtual port ID is assigned.

16. The method of claim 14 wherein the step of coupling the groups to a switch comprises the step of coupling the groups to a switch comprising host facing ports, each host facing port coupled to a host, and a zoning table associating each virtual port ID to a host facing port.

17. The method of claim 16 wherein the step of using by the host a virtual port ID comprises communicating by the host only with groups having assigned virtual port IDs associated the host facing port to which the host is coupled.

18. The method of claim 17 wherein the storage array is a fibre channel array and wherein the at least one physical port is a fibre channel port.

19. A method comprising the steps of:
providing a storage array including a plurality of physical ports;
coupling the storage array to a switch via the physical ports;
arranging logical units in the storage array into a plurality of individual logical units of physical storage space organized into a plurality of groups of logical units of storage, each group having at least two of the individual logical units such that the at least two individual logical units are part of the group distinguished from being mapped to the group;
coupling the groups to a switch through at least one physical port on the storage array, each group being coupled to one or more physical ports of the plurality of physical ports on the array;
assigning to each group a unique virtual port ID that uniquely identifies the group for each physical port on the array to which it is coupled, with each group of the plurality of groups of logical units of storage that is coupled to two or more physical ports of the plurality of physical ports being assigned a unique virtual port ID for each of the two or more physical ports to which that same group is coupled such that multiple unique virtual port IDs are assigned to that same group, wherein a group of the plurality of groups of logical units of storage is assigned multiple virtual port IDs and two physical ports of the two or more physical ports, and wherein a first virtual port ID of the multiple port IDs corresponds to the first physical port of the two physical ports and a second virtual port ID of the multiple port IDs corresponds to the second physical port of the two physical ports;
coupling a host to the switch;
using by the host a virtual port ID to exchange data with the group in the storage array to which the virtual port ID is assigned.

20. The method of claim 19 wherein the step of assigning is performed by the switch.

21. The method of claim 20 wherein the step of coupling the groups to a switch comprises the step of coupling the groups to a switch comprising host facing ports, each host facing port coupled to a host, and a zoning table associating each virtual port ID to a host facing port.

22. The method of claim 21 wherein the step of using by the host a virtual port ID comprises communicating by the host only with groups having assigned virtual port IDs associated with the host facing port to which the host is coupled.

23. The method of claim 22 wherein the storage array is a Fibre Channel array and wherein the at least one physical port is a Fibre Channel port.

* * * * *